United States Patent [19]

Welch

[11] 4,134,225

[45] Jan. 16, 1979

[54] COLLAPSIBLE BAIT TRAP

[75] Inventor: Kenneth L. Welch, Carthage, Mo.

[73] Assignees: Virgil W. Rogers, Oronogo; Max H. Glover, Webb City, both of Mo. ; part interest to each

[21] Appl. No.: 766,033

[22] Filed: Feb. 7, 1977

[51] Int. Cl.$^2$ ............................................. A01K 69/00
[52] U.S. Cl. ....................................... 43/100; 150/48
[58] Field of Search .................... 43/105, 100, 65, 56, 43/64, 66, 11; 150/49, 48, 50; 220/229; 222/498, 461; 141/337, 338

[56] References Cited

U.S. PATENT DOCUMENTS

| | | | |
|---|---|---|---|
| 216,227 | 6/1879 | Sedgwick | 150/49 X |
| 1,232,827 | 7/1917 | Milbauer | 150/50 |
| 1,269,623 | 6/1918 | Logsdon | 43/65 |
| 1,445,763 | 2/1923 | Gibbs et al. | 43/100 |
| 1,985,177 | 12/1934 | Lawrence | 43/100 |
| 2,522,017 | 9/1950 | Bergman | 43/100 X |
| 2,935,811 | 5/1960 | Hurtig | 43/105 |
| 3,029,546 | 4/1962 | Ruiz | 43/105 |
| 3,077,695 | 2/1963 | Winter | 43/105 X |

FOREIGN PATENT DOCUMENTS

| | | | |
|---|---|---|---|
| 459749 | 9/1949 | Canada | 43/105 |
| 114165 | 12/1899 | Fed. Rep. of Germany | 43/105 |
| 67568 | 4/1928 | Sweden | 43/65 |
| 180883 | 9/1962 | Sweden | 43/100 |

*Primary Examiner*—Clifford D. Crowder
*Attorney, Agent, or Firm*—Clarence A. O'Brien; Harvey B. Jacobson

[57] ABSTRACT

A collapsible bait trap for fishermen and the like having a flexible container member of cylindrical configuration with one end substantially closed and the other end basically open, together with a flexible member with a small central aperture provided therein for reception in the open end of the flexible container to provide a reversible funnel-like member. The substantially closed end of the container is provided with a plurality of small holes therein for permitting water flow through the container. A coil spring is provided between the closed end and the funnel-like member of substantially the same diameter as the internal diameter of the flexible container when fully open. Said spring is of sufficient strength to normally maintain the container in the erected state but being also easily collapsed into a small telescoped article when it is desired to store the bait trap when not in use. A strap member is provided at one end of the container, which is of sufficient size to pass over the other end of the container when in the collapsed state, to prevent the spring from expanding the container. The strap member also will function as a handle when the trap is being used to collect bait.

A novel method of making this collapsible bait trap is also disclosed herein. This method includes the collapsing and taping of the coil spring, the placing of one piece of transparent plastic on an assembly machine table, placing the tape and collapsed coil spring in the middle of said one piece of plastic, placing another piece of plastic over both the collapsed spring and the one piece of plastic and then sealing and trimming the edges of the two pieces of plastic to form the completed trap. The assembled trap is then usable by merely severing the tape holding the spring collapsed which will then permit the spring to expand and erect the trap.

4 Claims, 9 Drawing Figures

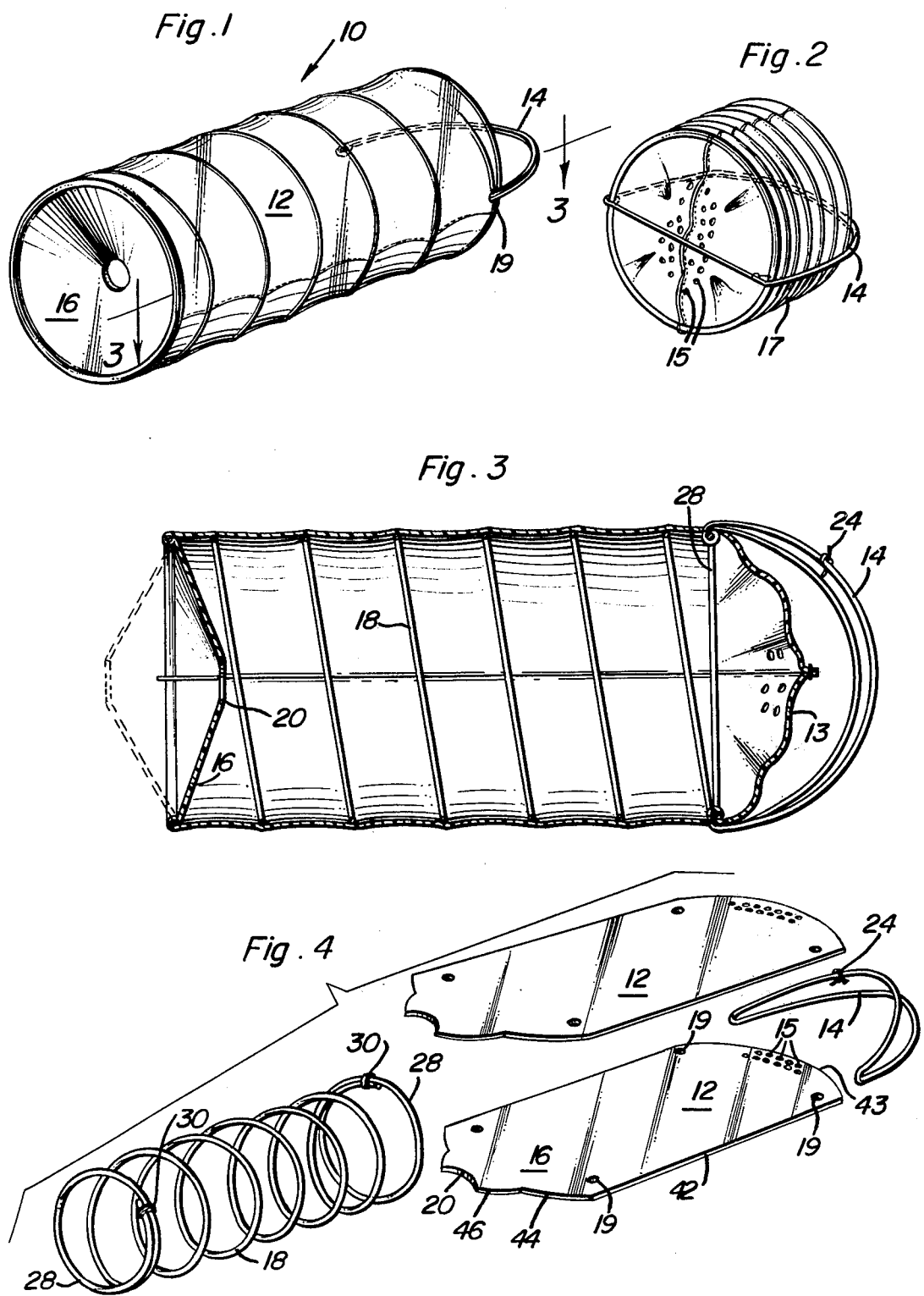

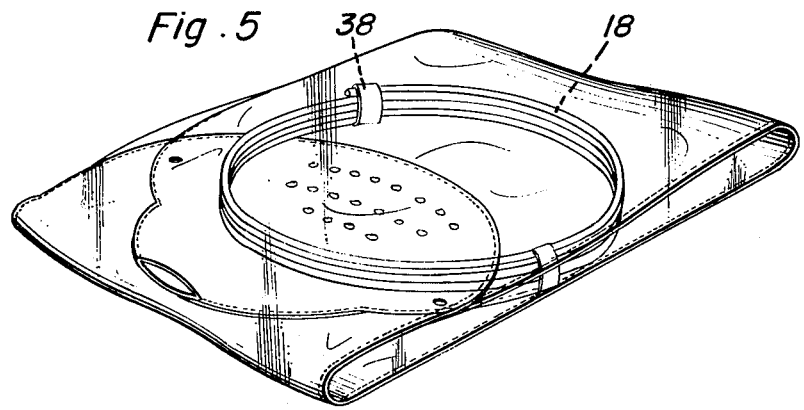
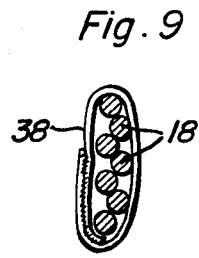
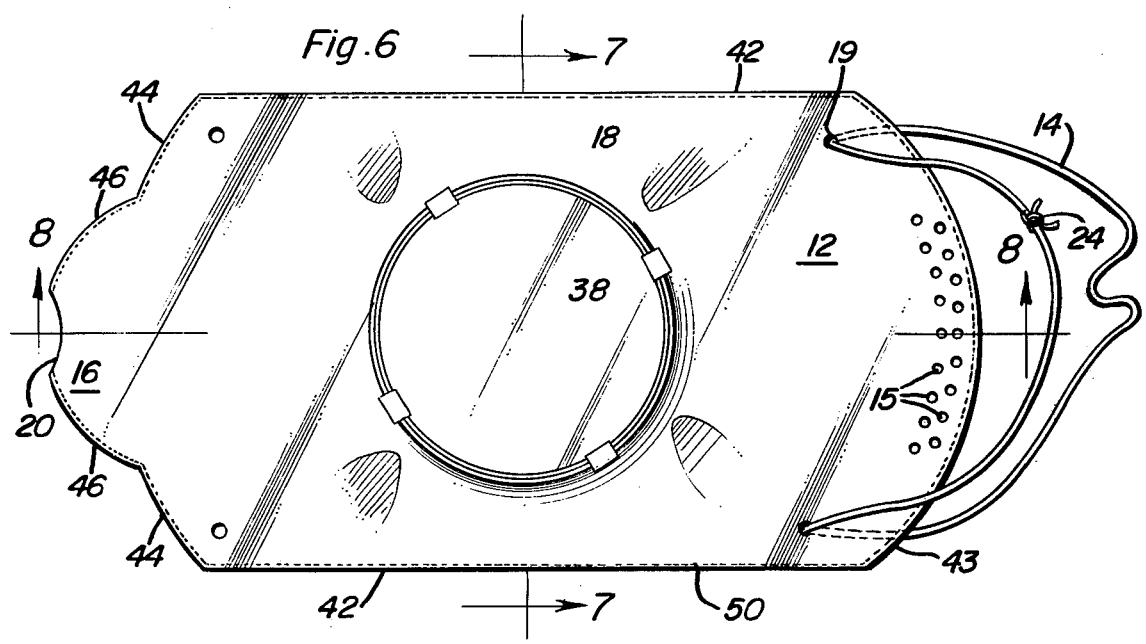
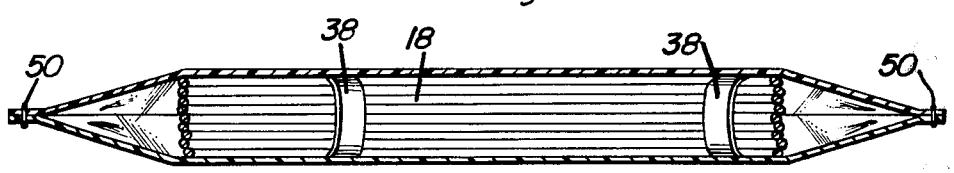
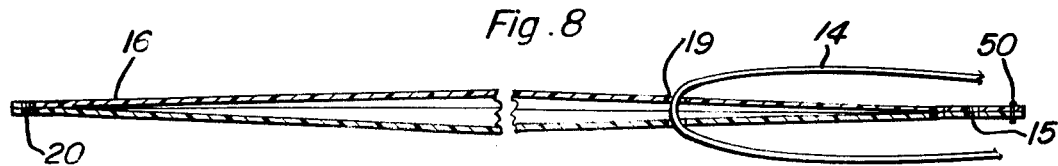

COLLAPSIBLE BAIT TRAP

BACKGROUND OF THE INVENTION

1. Field of the Invention

This invention relates generally to devices for trapping bait and the like for use by fishermen and other outdoorsmen and is telescopically collapsible so that the structure may be easily stored and transported when not in use.

2. Description of the Prior Art

One problem with known type bait traps, such as minnow traps which are collapsible, is that they are of material of metal which limits the degree to which they may be collapsed, and also makes them heavier than is desired for convenient portability.

Another problem with known type devices is in the arrangement for allowing bait into the trap when in use, while being designed to prevent the exit of the bait once trapped.

Another problem with known type devices is that the carrying handles used therewith only function for that specific purpose and no other.

A problem with the making of known type devices is that a number of component parts are normally needed which must be shaped and fabricated, and then assembled into the completed trap. This often times requires a number of fairly complicated steps and procedures before the trap is finished as a completed device.

Another problem with known type devices is that they are not made so that they may be easily handled, stored, and shipped in a safe, convenient, and inexpensive form and manner.

Known prior art devices which may be pertinent to this invention are listed as follows Nos.:

725,706—Apr. 21, 1903
814,480—Mar. 6, 1906
1,269,623—June 18, 1918
1,445,763—Feb. 20, 1923
1,543,968—June 30, 1925
2,935,811—May 10, 1960

None of these devices offers the new and novel features of the invention disclosed herein.

SUMMARY OF THE INVENTION

An object of the present invention is to provide a collapsible bait trap which may be easily stored and transported in relatively small volumetric form and yet easily erected to the full open state ready for use as a bait catching trap.

Another object of this invention is to provide a flexible bag-like container member having a substantially closed end provided with small water flow apertures therein, and the other substantially open end being provided with a reversible funnel structure with a small central aperture therein for permitting the bait to enter the trap when in use and yet preventing their easy exit therefrom.

A further object of this invention is to provide a collapsible bait trap having a resilient spring member internally thereof for maintaining the trap in the erected and fully open state while permitting easy telescopic collapse of same into substantially smaller form when the trap is not in use. A strap member is also provided for the dual function of a handle as well as retaining member for maintaining the trap in collapsed form.

An additional object of this invention is to provide a novel method of making the collapsible bait trap which is relatively simple and requires few steps. A first sheet of plastic is provided upon which is placed a collapsed and taped resilient coil spring of proper size, whereupon a second sheet of plastic is placed thereover and the edges of the two pieces of plastic appropriately secured together and trimmed to proper size and shape. The necessary new and unique shape of the two pieces may be pre-cut before assembly, or may be done simultaneously with assembly. A handle string is then added to complete the basic trap structure.

Another further object of this invention is to provide a method of making a collapsible bait trap which will be completely formed in a simple and inexpensive manner, and yet provide a trap which is easily stored and transported in a small compact form. Upon receipt by a consumer and would-be user of the trap, it may then be quickly and easily erected into its final form and shape. And, even in this form, it is still collapsible for storage and transporting in the minimum volume.

The collapsible bait trap of this invention has a number of new and unique features. A primary container member of flexible material such as plastic or the like is used for the main element of the trap. One end of said container member is substantially closed but provided with small holes or apertures therethrough for permitting water flow through the trap when in use. The other end of the container member is also substantially closed, but with this end having a small central aperture therethrough. This central aperture permits the flexible plastic end to function as a reversible funnel. When the trap is in use, the funnel will point inwardly toward the inside of the container and thus permit small fish, minnows, and other bait to enter the trap along with the natural flow of water of the stream or lake in which the device is set up. After the bait has been suitably trapped within the container, by picking the device up by a handle member attached at the opposite end of the structure, the funnel member will reverse with the funnel point and aperture directed away from the inside of the container to permit dumping of the trapped bait into another suitable container, such as a minnow bucket or the like. A coil spring is provided within the bag-like container and between the substantially closed end and the funnel-like member end for maintaining the trap in the erected position. The diameter of the coil spring is substantially that of the inside diameter of the container member. Thus, the spring will tend to maintain the trap in erected form with the largest volumetric size possible.

A user of the device may simply collapse and telescope the flexible container by pressing upon the two ends thereof toward each other, and then once the trap is substantially collapsed, the handle strap, which is of sufficient length to go over the funnel end of the container and maintain the trap in collapsed form, is moved into the position shown in FIG. 2.

The container member with apertured closed end, as well as the reversible funnel end, may be made of soft plastic material of clear or semi-opaque type. If the trap is made of clear plastic, it becomes practically invisible when anchored by the handle strap at the bottom of a lake, river, pond, or the like. Thus, fish, minnows, and other small bait swimming along the bottom will be directed into the inwardly formed funnel and through the small aperture therein so as to become trapped within the device. After a suitable amount of bait has been caught, the trap may then be removed from whatever anchor means is used and lifted by the handle, and with the funnel reversing outwardly as the trap is lifted, the caught bait dumped into other containers for transporting and use. When the user of the device is through trapping bait, the entire device may then be easily and quickly collapsed, and the dual purpose handle strap used to maintain the overall trap in the collapsed form. The handle strap may also be made of cord, string, plastic, or other type material.

The method of making this collapsible trap also is new and unique. Basically, the method includes the steps of forming a resilient coil spring of desired diameter, collapsing same into its most compact form, taping at at least two points around the circumference of the same to retain same in the compact collapsed form, placing said collapsed spring upon a piece of plastic of desired size, overlaying both with a second piece of plastic of desired size and then die-cutting the specially configured shape of the two pieces of plastic from the overall size thereof. Simultaneously, with this cutting and shaping operation a handle string aperture as well as water holes may be cut in said pieces. The edges of the outside perimeter of the two pieces of plastic are then suitably secured together, such as by sewing, pressure or heat bonding, or the like. The method disclosed herein also envisions the simultaneous heat bonding of the two pieces together along the necessary edges with the die-cutting of the special configuration as well as die-cutting of the handle string and water flow holes. The trap is then completed by inserting a string member through the handle holes and typing a knot there for completion of the desired handle loop. This completed trap is now in a form which may be folded by placing one end over the center portion containing the collapsed spring, and then the other end over the first folded end. The final package is then of just slightly greater size and thickness than the collapsed spring member itself. This compact package may then be easily stored, distributed, and sent through the mails, or otherwise sold to an ultimate consumer. Upon receiving this compact package, the ultimate consumer then needs only to reach in through the funnel end of the open plastic structure and sever the tapes securing the coils of the spring together in collapsed form. Upon severing the securing tapes, the spring will then expand and by a simple manipulation of the spring within the plastic envelope, the trap will then be in its completed and erected form. Then for future storage, the trap may be easily compressed into a relatively compact form by merely pressing inwardly on the opposite ends thereof and securing with the loop handle string.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the bait trap of this invention in open position and looking at the funnel end thereof.

FIG. 2 is a perspective view of the bait trap in collapsed form as viewed from the other end.

FIG. 3 is a side elevational view, partly in cross section, taken generally along line 3—3 of FIG. 1.

FIG. 4 is an exploded perspective view of the component parts of the device prior to assembly.

FIG. 5 is a perspective view of the completed bait trap as folded after completion of the making thereof.

FIG. 6 is a plan view of the assembled trap and illustrating final steps in the making thereof.

FIG. 7 is an elevational view, partly in cross section, taken generally along line 7—7 of FIG. 6.

FIG. 8 is an elevational view, partly in cross section, taken generally along line 8—8 of FIG. 6.

FIG. 9 is a detailed view, partly in cross section, of the collapsible spring with tape tie arrangement.

DESCRIPTION OF THE PREFERRED EMBODIMENT

Referring to FIG. 1 of the drawings, reference numeral 10 indicates in general the collapsible bait trap of this invention as erected and ready for use to catch minnows, small fish, crawfish, and the like. The primary unit of the trap is a bag-like container 12 substantially closed at end 13. This closed end 13 is provided with small apertures or holes therein 15 for permitting water flow therethrough. Also attached at this end of the container is a member 14 which has a dual purpose function of use as a carrying and dumping strap as well as a retaining member for holding the trap in the collapsed form. This member 14 is preferably formed of a strong string of nylon or the like of appropriate length to loop through suitable openings 19 provided in the plastic material. Preferably the loop strap 14 will be applied after the trap has been erected and with the loops at either end thereof going around the spring ring 28 formed at either end of the collapsible spring member. After installation of the string loop 14, a suitable knot 24 is used to secure the two ends together.

The other end of the container 12 has formed therewith a flexible member 16 which is substantially of funnel shape having a small aperture at the center thereof. This flexible member 16 functions in a dual purpose manner, that is when the funnel is pointed inwardly, as in the cross section of FIG. 3, the bait to be trapped swimming along the bottom of a river, stream, pond or lake upon contact with the member 16 will be directed toward the opening 20 and into the trap. Once inside the trap, if they attempt to swim back toward the funnel member, they will be directed toward the outside of the member 16 and against the inner wall of the container rather than toward the opening 20. Thus, once caught, most of the bait will remain trapped inside of the device. The holes 13 at the closed end of the trap permit water flow through opening 20 and through the trap in an obvious manner. If the trap is made of clear plastic material, which is preferable, when anchored by the strap at the bottom of a body of water, it will be practically invisible to the bait approaching same and thus will function with the utmost efficiency as a trap.

In order to maintain the trap in erected form, a resilient spring 18 is provided within the container. The respective ends 28 of the spring 18 engage with the respective ends of the trap and the spring 18 is preferably of substantially the same outside diameter as the inside diameter of the container 12. The spring ends 28 are taped (30) to form complete circles as best seen in FIG. 4. In order to collapse the trap for storage, transportion, and easy portability in carrying by a user, one need merely to push on the opposite ends of the container to collapse same into the same volumetric form of FIG. 2, and then move the string member 14 over the funnel end as shown in FIG. 2 to retain the trap in collapsed form.

Another feature of this collapsible trap is the reversible funnel structure 16, 20. While the funnel shown in solid lines functions to guide bait into the trap, after a suitable amount of bait has been caught, then by lifting of the member 14 which functions in this stage as a lifting handle, the caught bait can be dumped from the trap into another container suitable for transporting and use of the bait by a fisherman or the like. This is achieved by the funnel member reversing position due to the weight of water and bait to assume the shape as indicated in dotted lines in FIG. 3, which will permit the bait to be easily dumped into other suitable containers such as a minnow bucket.

While the spring member 18 preferably is of metal, it also may be made of transparent plastic material so that it will also be relatively invisible to the bait approaching trap.

The method of making this collapsible bait trap is also new and unique. Looking at FIGS. 4–9, the method of making will now be described in detail. At least two pieces of plastic material are cut and shaped with the special configuration as best seen in FIGS. 4 and 6. That is, with parallel side edges 42, a rounded end edge 43 at one end of the panels, and similarly partially rounded edges 44 at the other end of the panels having outwardly projections portions 46 provided thereon. Recessed portions 20 are cut into the outer central edge of the projections 46. The steps in assembly of the trap are as follows: the resilient spring member 18 with the full circle ends 28 thereon is collapsed into the smallest form thereof and suitably retained in this collapsed form by means of tapes 38. These are best seen in the views of FIGS. 5, 6, 7 and 9. After the spring has been taped, it is placed approximately in the center of one of the plastic panel members, and then the other plastic panel member is placed thereover and the edges of the outside of the respective panel members aligned with each other. At this point, suitable sewing machinery may be used to sew the respective edges tightly together as indicated at 50 in the views of FIGS. 7 and 8. Instead of sewing the edges together, pressure and heat bonding may be used if suitable plastic materials are used for the panels 12. Once the panels have been secured together, the strap string 14 may be suitably looped through holes 19 for the handle structure. The overall structure may then be folded as shown in FIG. 5, without the handle, ready for storage, distribution and sale thereof. While the string handle 14 has been installed in the view of FIG. 6, preferably the package will be as shown in FIG. 5 without the handle string member 14 installed, and the string will merely be supplied with the folded package for installation by the ultimate user thereof after the initial erection of the device. This is preferable because by installing the loop string after the device has initially been erected, as best visualized by looking at FIGS. 1 and 3, the handle loop string may appropriately pass around the spring end member 28 to substantially eliminate the possibility of the handle pulling the plastic apart where the handle attachment holes 19 are provided. This is especially important once the device is in use and lifting quantities of relatively heavy water with trapped bait therein.

While the method described above utilizes panels 12 which have been pre-cut in the special configuration shown, together with the holes 19 for the loop handle as well as apertures 15 for water passage through the end 13, this invention also envisions the use of large sheets of plastic, or plastic envelopes, wherein the collapsed spring structures after taping thereof will be appropriately located along the sheets of plastic or within the plastic envelopes and then automatic or semi-automatic machinery will simultaneously cut and secure the outside edges of the panels as well as die-cutting or otherwise forming the apertures 19 and 15. On an assembly line basis with automatic machinery, thousands of these devices could be produced in a single day. All that would be necessary to do would be to fold the device together with a new string therewith and suitable instructions for erection of the device and the structure would be ready for distribution and selling.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A collapsible aquatic bait trap, comprising:
    a collapsible container body member of substantially cylindrical conformation, a first end of the body member being closed and a second end of the body member being at least partially open;
    a funnel member connected to the body member at the second end thereof and having a central aperture formed therein for providing at least a partial opening in the second end of the body member to communicate the interior of the body member with ambient, the funnel member extending into the interior of the body member to define a pathway thereinto;
    a helical spring member disposed within the body member extending from said first end to said second end thereof, the spring member having outermost surfaces thereof abutting portions of the inner surface of the body member and maintaining the body member in said substantially cylindrical conformation; and,
    handle means for retaining the spring member under compression when the body member and spring member are collapsed inwardly thereof along the longitudinal axes thereof, the handle means comprising an elongated member attached at opposite ends thereof to diametrically spaced points on the first end of the body member, the elongated member being graspable when the body member and spring member are in an extended, uncollapsed conformation to allow the trap to be carried, the elongated member further being received substantially about the periphery of the collapsed body member and spring member to maintain the trap in a collapsed conformation for compact storage thereof, wherein the body member is adapted to contain water and wherein the funnel member is formed of a non-rigid material and is supported only by the structural integrity of said material, the funnel member inverting outwardly of the second end of the body member on downward disposition of the body member to cause water to flow through the aperture and exert force against the funnel member.

2. The trap of claim 1 wherein the elongated member is formed of a non-rigid material.

3. The trap of claim 2 wherein the elongated member is formed of a flexible material.

4. The trap of claim 1 wherein that portion of the body member enclosing the first end thereof has a plurality of apertures formed therein for permitting water flow through the trap.

* * * * *